J. F. KELLER.

Assignor to HAGERSTOWN AGRICULTURAL IMPLEMENT MANUFACTURING CO.

Seeder.

No. 8,344. Reissued July 23, 1878.

Attest.
Jeremiah F. Tosling
Arthur Stem

Inventor.
John F. Keller
by Hall & Packinson
his attys

N. PETERS, PHOTO-LITHOGRAPHER, WASHINGTON, D. C.

UNITED STATES PATENT OFFICE.

JOHN F. KELLER, OF HAGERSTOWN, MARYLAND, ASSIGNOR TO HAGERSTOWN AGRICULTURAL IMPLEMENT MANUFACTURING COMPANY.

IMPROVEMENT IN SEEDERS.

Specification forming part of Letters Patent No. 153,345, dated July 21, 1874; Reissue No. 8,344, dated July 23, 1878; application filed February 14, 1878.

DIVISION B.

*To all whom it may concern:*

Be it known that I, JOHN F. KELLER, of Hagerstown, county of Washington, and State of Maryland, have invented an Improvement in Seeders, of which the following is a specification:

This invention has relation to that class of seeding-machines wherein vertical and longitudinal drill-teeth or tubular hoes are employed in gangs; and the improvement designed to be covered by this division of the reissue consists particularly in a novel device for adjusting the hoes into one or two lines, as will be hereinafter more fully explained, Division A of this reissue relating more especially to a novel arrangement of axles, in combination with spring-hoes, for the purpose of preventing the breaking of the hoe by binding against the axle.

Figure 1:
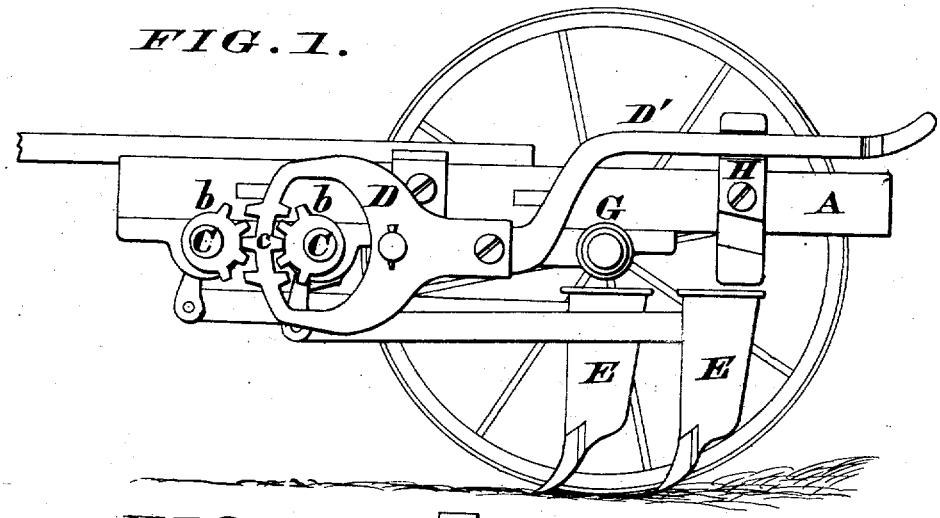
Figure 2:
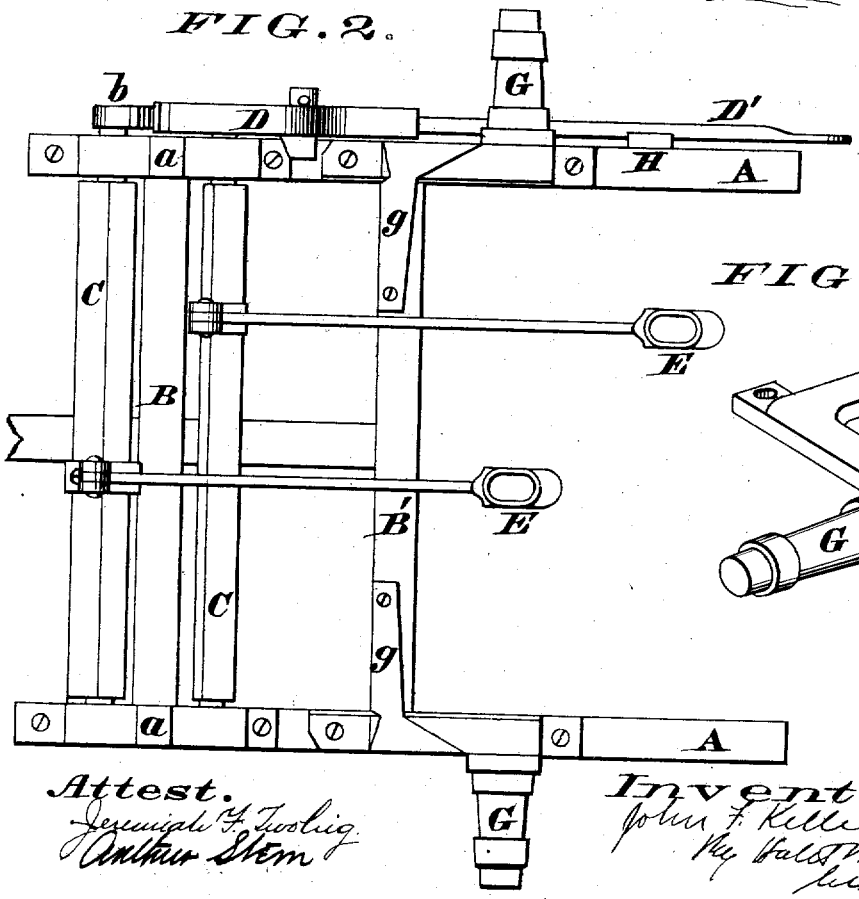
Figure 3:
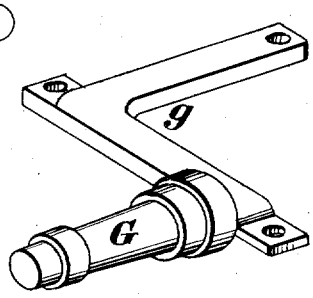

In this division (B) of the reissue, Figure 1 of the drawing is a representation of a side view of the machine. Fig. 2 is a bottom view. Fig. 3 is a view of the axle.

In the annexed drawing, A A designate two longitudinal bars, and B B′ are two cross-bars, which constitute the frame for a seeding-machine. Near the front end of this frame, and supported by journal-boxes *a a*, which are bolted to the under side of the bars A A, are two rocking bars, C C, which are arranged parallel to each other, and have toothed segments *b b* at their ends. These segments engage with a curved rack, *c*, formed at the end of a vibrating lever, D′. By vibrating this lever the bars C C can be rocked in opposite directions.

As grain-drills are constructed, some with shifting-bars to arrange the hoes in two ranks, and others without shifting-bars, there is an advantage in having the arrangements for shifting-bars attached readily underneath the main frame of the machine, as shown in my drawing. Thus the frame-work A A B B′ is the same for all drills, whether they are designed to be shifting-hoe drills without the shifting-hoe attachments, and all frames for the drills that are made by manufactory can be thus got out alike. Thus those that are to have shifting-bars attached can have the journal-boxes applied underneath the frame, thereby securing the shifting-bars and the hoes attached thereto. There is also an advantage in having the arrangement of levers and racks, by which the hoes are to be adjusted in one rank or in two, placed upon the outside of the main frame, as shown in my device at D and D′, Fig. 1, and D and B′, Fig. 2. Being outside, it can be readily got at for adjustment, &c., and the lever D′ being carried back and secured in the rack H on the rear of the frame, enables the operator of the drill to shift the hoes without pulling backward upon the drill; for where the hoes are shifted by means of a vertical lever at the point of shifting attachment, the operator, in pulling backward on the lever to that extent, stops the progress of the drill or pulls backward, making a heavier load for the team, while, by my arrangement and devices and curved lever, I construct a drill so that the operator simply has to push down vertically upon a lever substantially horizontal and change its position in the rack H. In this manner to shift the hoes from one to two ranks, or vice versa, and pushing down vertically, instead of pushing backward, he does not retard the progress of the machine.

H shows a rack upon the rear frame, to secure the lever D′ in place and hold the ranks of the hoes in their proper position. The lever D′ is curved above the axle, and carried back horizontally, for the purpose before indicated.

E E designate the tubular drill-teeth, which are connected by means of their drag-bars to brakes secured to the rocking bars C C. The hoes are thus alternately attached to the side bars and allowed free vertical motion, so that they will accommodate themselves to the inequalities of the surface passed over.

By rocking two bars, C C, the hoes can all be adjusted in one line, or they can be adjusted in two lines, as fully set forth in Letters Patent heretofore granted me, No. 174,929.

G G are the axles, on which the transporting-wheels are applied, and which are more particularly the subject of Division A in this reissue. These axles do not extend across the frame, but are constructed with L-shaped braces *g*, which are securely bolted to the under side of the longitudinal bars A A and the cross-bar B′. I thus firmly brace the frame, and at the same time firmly secure the axles to it. The cross-bar B′ is arranged so far in front of the axles G that the hoes are free to rise clear of the ground.

It will be apparent that by the arrangement I have herein described for attaching the shifting-bars to the main frame of the machine the main frame is made much stronger, inasmuch as it does not have to be cut to secure the shifting-rails; also, by my arrangement, if a shifting-rail were to break, a new one to replace it can be readily put in without taking apart the other parts of the machine.

What I claim in this division of my reissue is—

1. The combination of main frame A A B and shifting-bars C C, the shifting-bars being arranged underneath the main frame, and one on either side of the main cross-bar B, substantially as and for the purposes described.

2. The combination of a main frame, A A B, shifting-bars C C, arranged underneath the main frame, gearing D *c b b*, and horizontal lever D′, substantially as and for the purposes described.

JOHN F. KELLER.

Witnesses:
D. F. HULL,
JNO. M. KNODLE.